(12) United States Patent
Galbreath et al.

(10) Patent No.: US 10,251,487 B2
(45) Date of Patent: Apr. 9, 2019

(54) SEAT ASSEMBLY HAVING A THORACIC SUPPORT MECHANISM

(71) Applicant: Lear Corporation, Southfield, MI (US)

(72) Inventors: Ashford Allen Galbreath, Troy, MI (US); Walter T. Cichocki, Brighton Township, MI (US)

(73) Assignee: Lear Corporation, Southfield, MI (US)

( * ) Notice: Subject to any disclaimer, the term of this patent is extended or adjusted under 35 U.S.C. 154(b) by 303 days.

(21) Appl. No.: 15/339,992

(22) Filed: Nov. 1, 2016

(65) Prior Publication Data
US 2018/0116406 A1    May 3, 2018

(51) Int. Cl.
A47C 7/46    (2006.01)
B64D 11/06   (2006.01)
B60N 2/22    (2006.01)
B63B 29/04   (2006.01)

(52) U.S. Cl.
CPC ............... A47C 7/465 (2013.01); B60N 2/22 (2013.01); B63B 29/04 (2013.01); B64D 11/0639 (2014.12); B64D 11/06395 (2014.12)

(58) Field of Classification Search
CPC  B60N 2/22; B64D 11/06395; B64D 11/0639; A47C 7/465
USPC ................. 297/284.7, 284.4, 284.1
See application file for complete search history.

(56) References Cited

U.S. PATENT DOCUMENTS

| | | |
|---|---|---|
| 3,086,817 A | 4/1963 | Wilfert |
| RE27,176 E | 9/1971 | Froelich |
| 4,143,909 A | 3/1979 | McFarlin |
| 4,597,386 A | 7/1986 | Goldstein |
| 5,054,854 A | 10/1991 | Pruit |
| 5,101,811 A | 4/1992 | Brunswick |
| 5,335,965 A | 8/1994 | Sessini |
| D359,192 S | 6/1995 | Franklin, III |
| 5,433,505 A | 7/1995 | Coyne et al. |
| 5,567,011 A | 10/1996 | Sessini |
| D383,027 S | 9/1997 | Riedell |
| 6,079,784 A | 6/2000 | Peachey |
| 6,227,617 B1 * | 5/2001 | von Moller ............ B60N 2/666 297/284.1 |
| 6,338,530 B1 * | 1/2002 | Gowing ................. A47C 7/465 297/284.1 |
| 6,471,294 B1 | 10/2002 | Dammermann et al. |
| 6,527,339 B2 | 3/2003 | Voris |
| 6,811,227 B2 | 11/2004 | Andersson et al. |
| 6,837,541 B2 | 1/2005 | Farquhar et al. |

(Continued)

FOREIGN PATENT DOCUMENTS

| | | |
|---|---|---|
| WO | 2014031819 A1 | 2/2014 |
| WO | 2014031820 A1 | 2/2014 |
| WO | 2014066493 A2 | 5/2014 |

OTHER PUBLICATIONS

Disclosure Statement for U.S. Appl. No. 15/339,992, filed Nov. 1, 2016.

*Primary Examiner* — Milton Nelson, Jr.
(74) *Attorney, Agent, or Firm* — Brooks Kushman P.C.

(57) ABSTRACT

A seat assembly having a seat back and a thoracic support mechanism. The thoracic support mechanism may have a flex plate that may be movably disposed on a support member of the seat back frame. A first actuator may flex the flex plate. A second actuator may actuate the flex plate along the support member.

9 Claims, 8 Drawing Sheets

(56) References Cited

U.S. PATENT DOCUMENTS

| | | | |
|---|---|---|---|
| 6,908,153 B2 * | 6/2005 | Blendea | A47C 7/465 297/284.4 |
| 7,059,678 B1 | 6/2006 | Taylor | |
| 7,083,232 B2 * | 8/2006 | Frank | A61H 15/0078 297/284.4 |
| 7,575,278 B2 | 8/2009 | Wissner et al. | |
| 7,611,199 B2 | 11/2009 | Michalak et al. | |
| 7,770,972 B2 | 8/2010 | Popa | |
| 7,841,663 B2 | 11/2010 | Nathan | |
| 7,984,948 B2 | 7/2011 | Colja et al. | |
| 8,585,141 B2 | 11/2013 | Limpaitoon | |
| 2002/0043842 A1 | 4/2002 | Nakamori | |
| 2004/0245811 A1 | 12/2004 | Bevan et al. | |
| 2008/0001452 A1 | 1/2008 | Schmitz et al. | |
| 2013/0226053 A1 | 8/2013 | Khan et al. | |
| 2014/0265491 A1 | 9/2014 | Galbreath et al. | |
| 2016/0031351 A1 | 2/2016 | Galbreath et al. | |

* cited by examiner

SEAT ASSEMBLY HAVING A THORACIC SUPPORT MECHANISM

TECHNICAL FIELD

This disclosure relates to a seat assembly having a thoracic support mechanism that may be provided in a seat back.

BACKGROUND

A lumbar support device is disclosed in U.S. Pat. No. 8,585,141.

SUMMARY

In at least one embodiment, a seat assembly is provided. The seat assembly may include a seat back that may have a seat back frame and a thoracic support mechanism. The seat back frame may include upper and lower cross members, first and second side members, a cross bar, and a support member. The upper and lower cross members may extend from the first side member to the second side member. The cross bar may be disposed between the upper and lower cross members and may extend from the first side member to the second side member. The support member may extend from the upper cross member to the cross bar. The thoracic support mechanism may be movably disposed on the support member. The thoracic support mechanism may include a flex plate, a mounting plate, a first actuator, and a second actuator. The flex plate may be movably disposed on the support member. The flex plate may have an upper end wall and a lower end wall that may be disposed opposite the upper end wall. The mounting plate may be disposed on the flex plate. The first actuator may be operatively connected to the flex plate. The first actuator may actuate the lower end wall of the flex plate toward the upper end wall of the flex plate to flex the flex plate away from the cross bar. The second actuator may be operatively coupled to the mounting plate. The second actuator may actuate the mounting plate and the flex plate along the support member.

In at least one embodiment, a seat assembly is provided. The seat assembly may include a seat back that may have a seat back frame and a thoracic support mechanism. The seat back frame may include upper and lower cross members, first and second side members, a cross bar, and a support member. The upper and lower cross members may extend from the first side member to the second side member. The cross bar may be disposed between the upper and lower cross members and may extend from the first side member to the second side member. The support member may extend from the upper cross member to the cross bar. The thoracic support mechanism may be movably disposed on the support member. The thoracic support mechanism may include a flex plate, a mounting plate, a fixed plate, a first actuator, and a second actuator. The flex plate may be movably disposed on the support member. The flex plate may have an upper end wall and a lower end wall that may be disposed opposite the upper end wall. The mounting plate may be disposed on the flex plate. The fixed plate may be fixedly disposed on the support member. The first actuator may be disposed on the fixed plate and may be operatively connected to the flex plate and the mounting plate. The first actuator may actuate the lower end wall toward the upper end wall to flex the flex plate away from the cross bar. The second actuator may be disposed on the fixed plate and may be operatively connected to the mounting plate. The second actuator may actuate the mounting plate and the flex plate along the support member.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
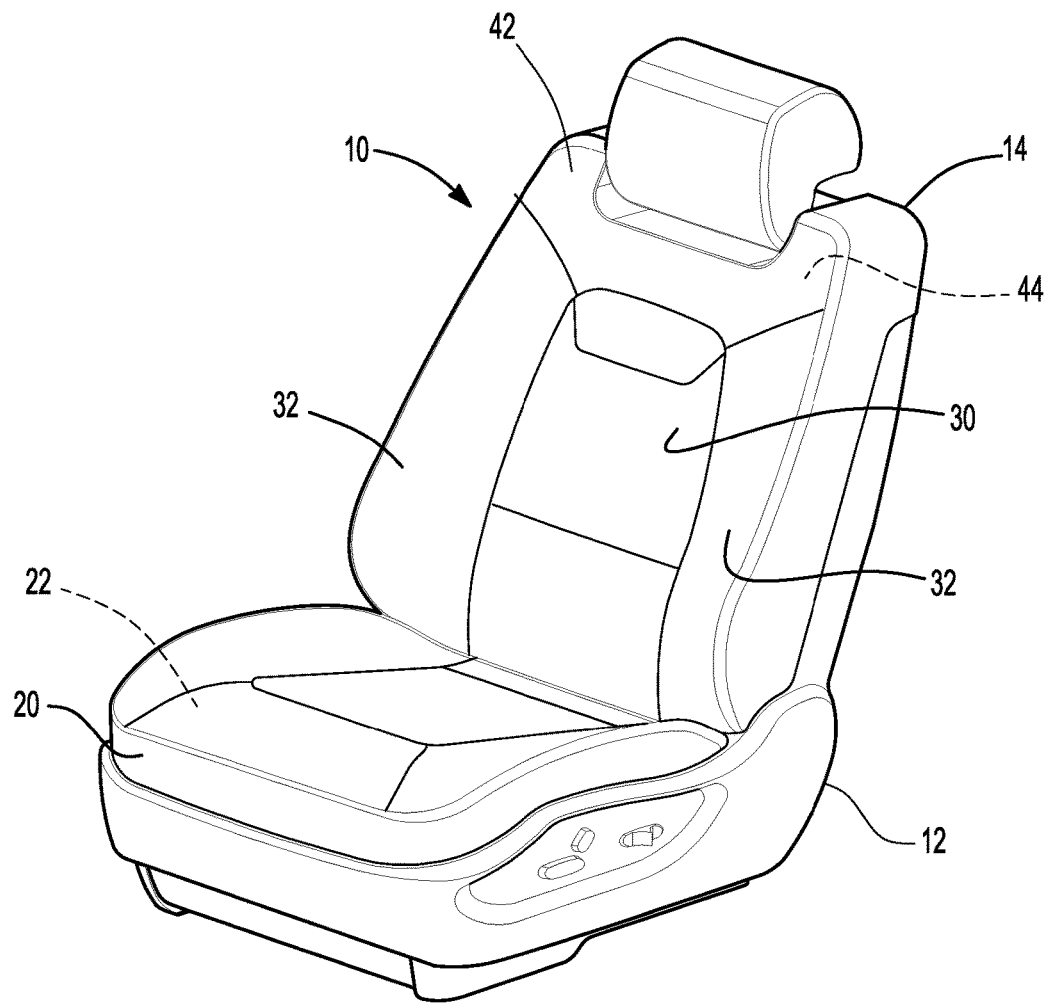
FIG. 1 is a perspective view of a seat assembly having a seat back.

Referring to FIG. 1, an example of a seat assembly 10 is shown. The seat assembly 10 may be configured for use in vehicular or non-vehicular applications. Vehicular applications may include land vehicles, such as a car or truck, or non-land vehicles, such as aircraft or marine vessels. Non-vehicular applications may include home or office furniture such as chairs or the like. The seat assembly 10 may include a seat bottom 12 and a seat back 14.

The seat bottom 12 may be configured to support the seat of a user or seat occupant. The seat bottom 12 may include a support structure, such as a seat bottom frame, seat pan, and/or support wires that may support and facilitate mounting of components of the seat assembly 10. The seat bottom 12 may also include seat bottom trim cover 20 and a seat bottom cushion 22.

The seat bottom trim cover 20 may be disposed over or upon the seat bottom cushion 22 and may form or provide at least a portion of a visible exterior surface of the seat bottom 12. Moreover, a user or seat occupant may be disposed on the seat bottom trim cover 20 when in a seated position. The seat bottom trim cover 20 may include a plurality of trim panels that may be assembled in any suitable manner, such as by stitching. In addition, the seat bottom trim cover 20 may be made of any suitable material, or materials, such as fabric, leather, vinyl, carpet, or combinations thereof.

The seat bottom cushion 22 may be at least partially concealed by the seat bottom trim cover 20 and may be directly or indirectly supported by the support structure of the seat bottom 12. The seat bottom cushion 22 may be made of any suitable material, such as foam.

Figure 2:
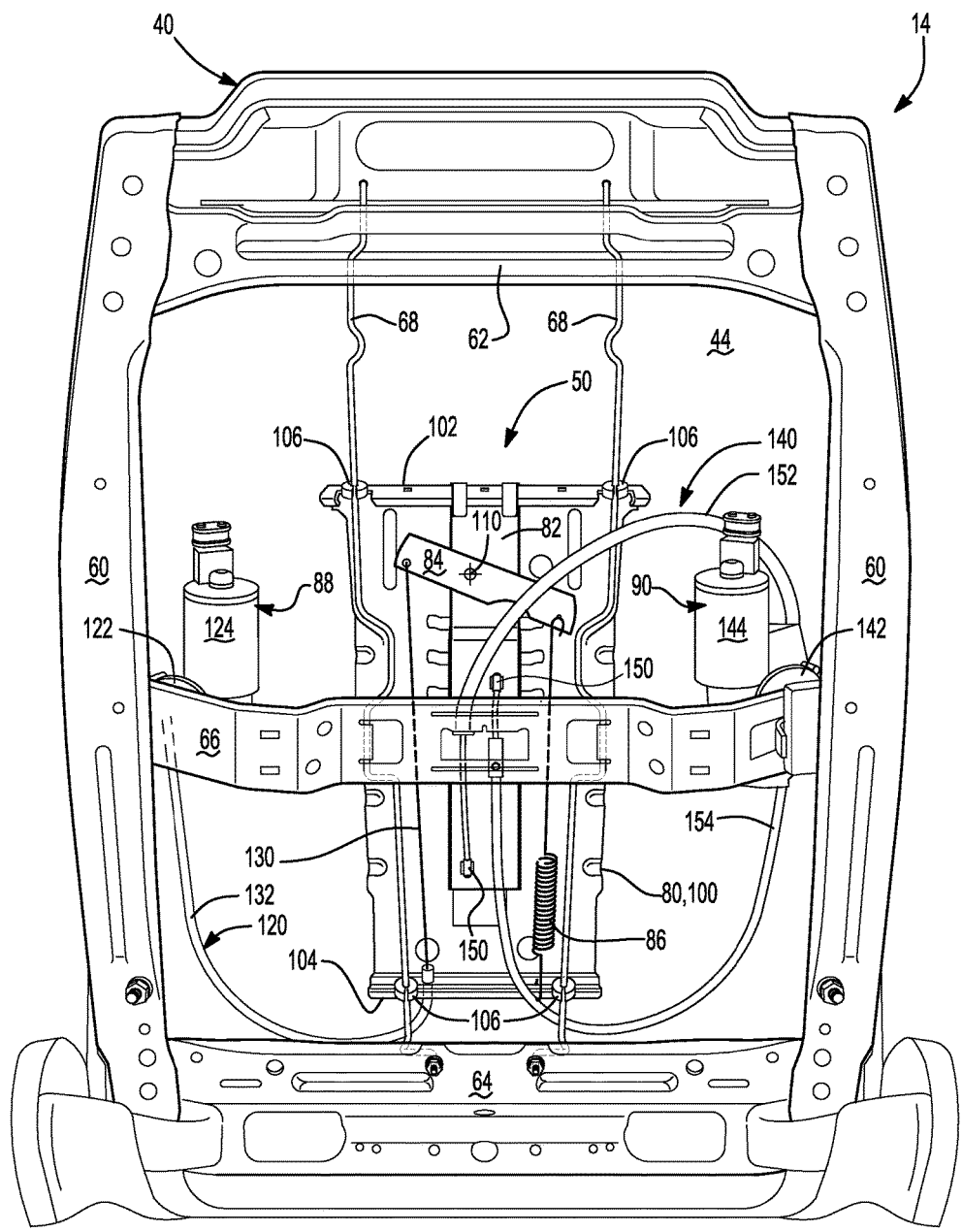
FIG. 2 is a rear view of the seat back without a trim cover showing a thoracic support mechanism in a lowered position with a flex plate in an unflexed condition.

The seat back 14 may be configured to support the back of a user or seat occupant. In at least one embodiment, the seat back 14 may be pivotally disposed on the seat bottom 12. The seat back 14 may include a center seating region 30 and a plurality of side bolsters 32. The side bolsters 32 may extend outwardly or forwardly from the center seating region 30 and may be disposed proximate and may extend along opposite sides of the center seating region 30. As such, the side bolsters 32 may generally extend along opposing lateral sides of the seat back 14 between the top and bottom of the seat back 14. Referring to FIGS. 1 and 2, the seat back 14 may also include a seat back frame 40, a seat back trim cover 42, a seat back cushion 44, and a thoracic support mechanism 50.

Referring to FIG. 2, the seat back frame 40 may support and facilitate mounting of components of the seat back 14. In at least one configuration, the seat back frame 40 may include a pair of side members 60, an upper cross member 62, a lower cross member 64, a cross bar 66, and at least one support member 68.

The side members 60 may be disposed along opposing lateral sides of the seat back 14, or along left and right sides of the seat back 14 from the perspective shown in FIG. 2. The side members 60 may be spaced apart from each other and may extend away from the seat bottom 12. For instance, the side members 60 may extend in a generally upward or vertical direction with respect to the seat bottom 12 when the seat back 14 is not folded over the seat bottom 12.

The upper cross member 62 may be disposed proximate the top of the seat back 14 and may interconnect the side members 60. The upper cross member 62 may be a separate component from the side members 60 or may be integrally formed with the side members 60 in one or more embodiments. As such, the upper cross member 62 may be fixedly positioned with respect to the side members 60. The upper cross member 62 may also facilitate mounting of a headrest.

The lower cross member 64 may be disposed proximate the bottom of the seat back 14 and may also interconnect the side members 60. As such, the lower cross member 64 may be disposed opposite the upper cross member 62. The lower cross member 64 may be a separate component from the side members 60 or may be integrally formed with the side members 60 in one or more embodiments. As such, the lower cross member 64 may be fixedly positioned with respect to the side members 60.

The cross bar 66 may be disposed between the upper cross member 62 and the lower cross member 64. The cross bar 66 may be spaced apart from the upper cross member 62 and the lower cross member 64 and may be disposed substantially parallel to the upper cross member 62, the lower cross member 64, or both. The cross bar 66 may extend between the side members 60 and may be fixedly disposed on the side members 60 in one or more embodiments.

One or more support members 68 may extend between the upper cross member 62 and the lower cross member 64. In the configuration shown in FIG. 2, a pair of support members 68 is provided that extends from the upper cross member 62 to the cross bar 66 and to the lower cross member 64. In the configuration shown in FIG. 5, the support members 68 extend from the upper cross member 62 to the cross bar 66 such that the support members 68 are spaced apart from and do not engage the lower cross member 64. It is contemplated that these configurations may be interchangeable. The support members 68 may be positioned between the side members 60 and near the center of the seat back 14. The support members 68 may be fixedly disposed on the upper cross member 62. In addition, the support members 68 may be fixedly disposed on the lower cross member 64, the cross bar 66, or both. The support members 68 may be positioned forward from the cross bar 66, or between the cross bar 66 and a seat back cushion 44. The seat assembly 10 will be primarily described with respect to a configuration having a pair of support members 68; however, it is to be understood that a greater or lesser number of support members 68 may be provided.

Referring to FIG. 1, the seat back trim cover 42 may be disposed over or upon the seat back cushion 44 and may form or provide at least a portion of a visible exterior surface of the seat back 14. The seat back trim cover 42 may include a plurality of trim panels that may be assembled in any suitable manner, such as by stitching. In addition, the seat back trim cover 42 may be made of any suitable material, or materials, such as fabric, leather, vinyl, carpet, or combinations thereof.

The seat back cushion 44 may be at least partially concealed by the seat back trim cover 42 and may be directly or indirectly supported by the seat back frame 40. In addition, the seat back cushion 44 may be disposed on and may be actuated by the thoracic support mechanism 50. The seat back cushion 44 may be made of any suitable material, such as foam.

Figure 8:
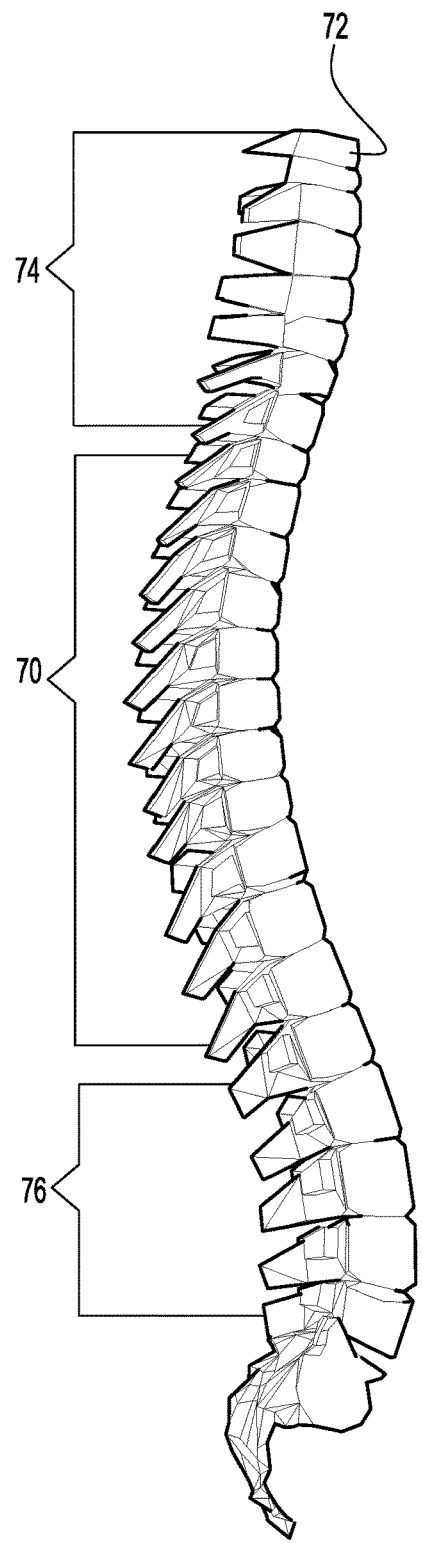
FIG. 8 illustrates various regions of a human spine.

Referring to FIG. 2, the thoracic support mechanism 50 may be disposed in the seat back 14. For example, the thoracic support mechanism 50 may be movably disposed on the support members 68. The thoracic support mechanism 50 may be configured to support a thoracic region 70 of a user's spine 72, which is best shown in FIG. 8, when the user is seated against the thoracic support mechanism 50. The thoracic region 70 may include and extend between the T1 and the T12 vertebrae and may be disposed between a cervical region 74 and a lumbar region 76. The cervical region 74 may include the C1 to C7 vertebrae. The lumbar region 76 may include the L1 to L5 vertebrae. A sacral or pelvic region of the spine 72 may be disposed below the lumbar region 76. In at least one configuration, the thoracic support mechanism 50 may not support the lumbar region 76.

It is believed that supporting the thoracic region 70 of the spine 72 may support as much as one-third of the upper body mass of a person and may help reduce associated load forces. Loads on the muscles, vertebrae, and discs in the lumbar region 76 and/or the sacral region of the spine 72 may be reduced by increasing support of the upper body mass, which may help reduce fatigue in these areas. The current prevalent comfort back supporting technology for the furniture and transportation fields focuses on the lumbar region 76 rather than the thoracic region 70 to provide relief from fatigue.

Figure 4:
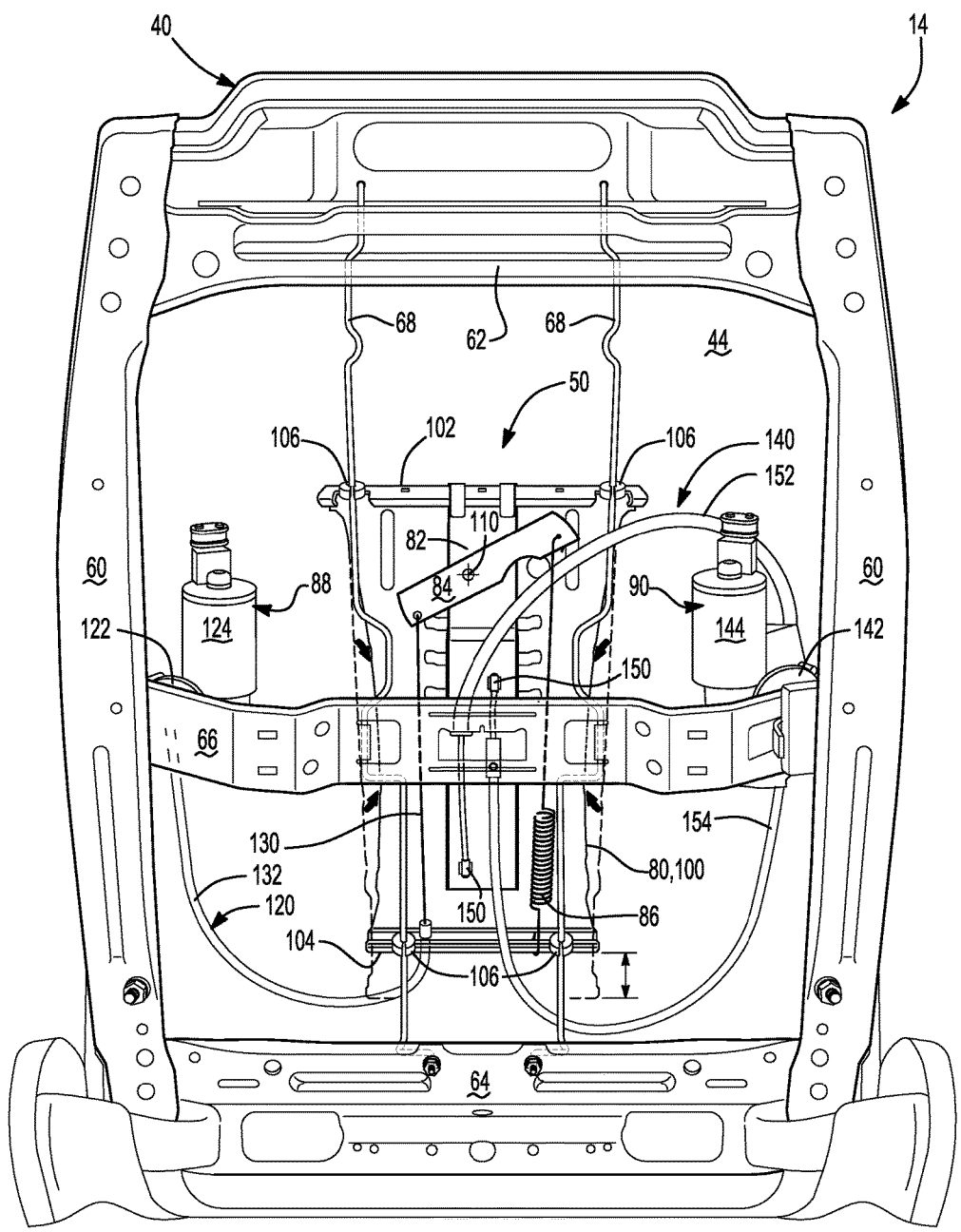
FIG. 4 is a rear view of the seat back of FIG. 3 showing the thoracic support mechanism in the lowered position with the flex plate in a flexed condition.

Referring to FIGS. 2 and 4, a first configuration of a thoracic support mechanism 50 is shown. The thoracic support mechanism 50 may include a flex plate 80, a mounting plate 82, a pivot member 84, a biasing member 86, a first actuator 88, and a second actuator 90.

Referring to FIG. 2, the flex plate 80 may be disposed proximate and may engage the seat back cushion 44. For example, the flex plate 80 may include a plate portion 100 that may be disposed between the seat back cushion 44 and the support member 68. The plate portion 100 may be disposed proximate or may engage a side of the seat back cushion 44 that may be disposed opposite the seat back trim cover 42. The flex plate 80 may also include an upper end wall 102 and a lower end wall 104.

The upper end wall 102 may be disposed at the top of the flex plate 80. As such, the upper end wall 102 may be disposed between the upper cross member 62 and the cross bar 66. The upper end wall 102 may extend in a rearward direction from an end of the plate portion 100 toward the support members 68. The upper end wall 102 may receive the support members 68 such that the flex plate 80 is slidable along the support members 68. For example, the upper end wall 102 may include one or more openings that may receive a bushing 106, which in turn may receive a corresponding support member 68.

The lower end wall 104 may be disposed opposite the upper end wall 102. As such, the lower end wall 104 may be disposed between the lower cross member 64 and the cross bar 66. The lower end wall 104 may extend in a rearward direction from an end of the plate portion 100 toward the support members 68. The lower end wall 104 may receive the support members 68 such that the flex plate 80 is slidable along the support members 68. For example, the lower end wall 104 may include one or more openings that may receive a bushing 106, which in turn may receive a corresponding support member 68. The flex plate 80, upper end wall 102, and lower end wall 104 may slide along the support members 68 together when actuated by the second actuator 90. The lower end wall 104 may slide along the support member 68 with respect to the upper end wall 102 when actuated by the first actuator 88. Movement of the flex plate 80 will be described in more detail below.

The mounting plate 82 may be disposed on the flex plate 80. For example, the mounting plate 82 may be fixedly disposed on the upper end wall 102 of the flex plate 80 and may extend downward toward the cross bar 66 and the lower cross member 64. The mounting plate 82 may be spaced apart from or may not be fixed to the lower end wall 104 of the flex plate 80 to permit the flex plate 80 to be flexed by moving the lower end wall 104 with respect to the upper end wall 102. The mounting plate 82 may be disposed under the flex plate 80. For instance, the mounting plate 82 may be disposed between the flex plate 80 and the cross bar 66. In addition, the mounting plate 82 may be laterally positioned between the support members 68.

The pivot member 84 may be pivotally disposed on the mounting plate 82. The pivot member 84 may be positioned between the upper cross member 62 and the cross bar 66. In addition, the pivot member 84 may be laterally positioned between the support members 68. The pivot member 84 may be rotatable about a pivot member axis 110 and with respect to the mounting plate 82. The pivot member 84 may facilitate flexing of the flex plate 80 between an unflexed condition and a flexed condition as will be discussed in more detail below.

The biasing member 86 may be coupled to the pivot member 84 and the lower end wall 104 of the flex plate 80. The biasing member 86 may have any suitable configuration. In the configuration shown in FIG. 2, the biasing member 86 is configured as a spring. A first end of the biasing member 86 may be coupled to the pivot member 84. A second end of the biasing member 86 may be coupled to the lower end wall 104. The biasing member 86 may exert a biasing force that may rotate the pivot member 84 about the pivot member axis 110 and that may urge the lower end wall 104 away from the upper end wall 102 to help actuate the flex plate 80 toward the unflexed condition.

The first actuator 88 may be operatively connected to the flex plate 80 and may flex the flex plate 80. The first actuator 88 may have any suitable configuration. For example, the first actuator 88 may include a first cable assembly 120, a first reel 122, and a first motor 124.

The first cable assembly 120 may include a cable 130 and a sheath 132.

The cable 130 may extend through the sheath 132 and may have a first cable end and a second cable end. The first cable end may extend out of the sheath 132 may be coupled to the first reel 122. The second cable end may also extend out of the sheath 132 may be coupled to the pivot member 84.

The sheath 132 may have a fixed length and extend from the first reel 122 or the housing of the first reel 122 to the flex plate 80. An end of the sheath 132 may be fixedly positioned on a portion of the flex plate 80, such as the lower end wall 104. As such, winding the cable 130 upon the first reel 122 may retract the cable 130 while allowing the sheath 132 to exert force that may actuate the lower end wall 104 toward the upper end wall 102 as will be discussed in more detail below.

The first reel 122 or a portion thereof may rotate about an axis to allow the cable 130 to be wound onto or unwound from the first reel 122. The first reel 122 may be disposed on a portion of the seat back frame 40, such as the cross bar 66.

The first motor 124 may rotate the first reel 122 about its axis. For example, the first motor 124 may rotate the first reel 122 in a manner that winds the cable 130 of the first cable assembly 120 onto the first reel 122.

The first actuator 88 may be turned on or off by a switch, such as a switch that may be actuated by a user of the seat assembly 10. Activation of the first actuator 88 may rotate the pivot member 84 about the pivot member axis 110 in a first direction or a counterclockwise direction from the perspective shown in FIG. 2. The biasing member 86 may rotate the pivot member 84 about the pivot member axis 110 in a second direction or a clockwise direction from the perspective shown in FIG. 2 when the first actuator 88 does not exert sufficient force on the cable 130.

The second actuator 90 may be operatively coupled to the mounting plate 82. The second actuator 90 may actuate the flex plate 80 and the mounting plate 82 along the support member or support members 68. As such, the second actuator 90 may move the flex plate 80 in a generally vertical direction or up and down in the seat back 14. The second actuator 90 may not flex the flex plate 80 or change the curvature of the flex plate 80 as will be discussed in more detail below. The second actuator 90 may have any suitable configuration. For example, the second actuator 90 may include a second cable assembly 140, a second reel 142, and a second motor 144.

The second cable assembly 140 may include one or more cables 150, an upper sheath 152, and a lower sheath 154.

One or more cables 150 may be provided to actuate the flex plate 80 and the mounting plate 82 up and down (e.g., toward and away from the upper cross member 62). In a single cable configuration, a cable 150 may extend through the upper sheath 152 and the lower sheath 154 such that opposing ends of the cable 150 are coupled to the mounting plate 82. The second motor 144 may rotate the second reel 142 such that the cable 150 is retracted through the upper sheath 152 and is permitted to extend through the lower sheath 154, thereby actuating the flex plate 80 and the mounting plate 82 upward toward the upper cross member 62. Conversely, the second motor 144 may rotate the second reel 142 in the opposite direction such that the cable 150 is permitted to extend through the upper sheath 152 and is retracted through the lower sheath 154 to actuate the flex plate 80 and the mounting plate 82 downward toward the lower cross member 64. In a two cable configuration, different cables may extend through the upper sheath 152 and the lower sheath 154. Rotating the second reel 142 in the first direction may wind the cable and the upper sheath 152 onto the second reel 142 and allow the cable in the lower sheath 154 to be unwound to facilitate upward movement. Rotating the second reel 142 in the second direction may unwind the cable in the upper sheath 152 and wind the cable in the lower sheath 154 onto the second reel 142 to facilitate downward movement. An end of the upper sheath 152 and an end of the lower sheath 154 may be mounted on the cross bar 66.

The second actuator 90 may be turned on or off by a switch, such as a switch that may be actuated by a user of the seat assembly 10. Moreover, the first actuator 88 and the second actuator 90 may be turned on and off by separate switches, thereby allowing independent adjustment of the vertical position and flexing or flexed condition of the flex plate 80.

Figure 3:
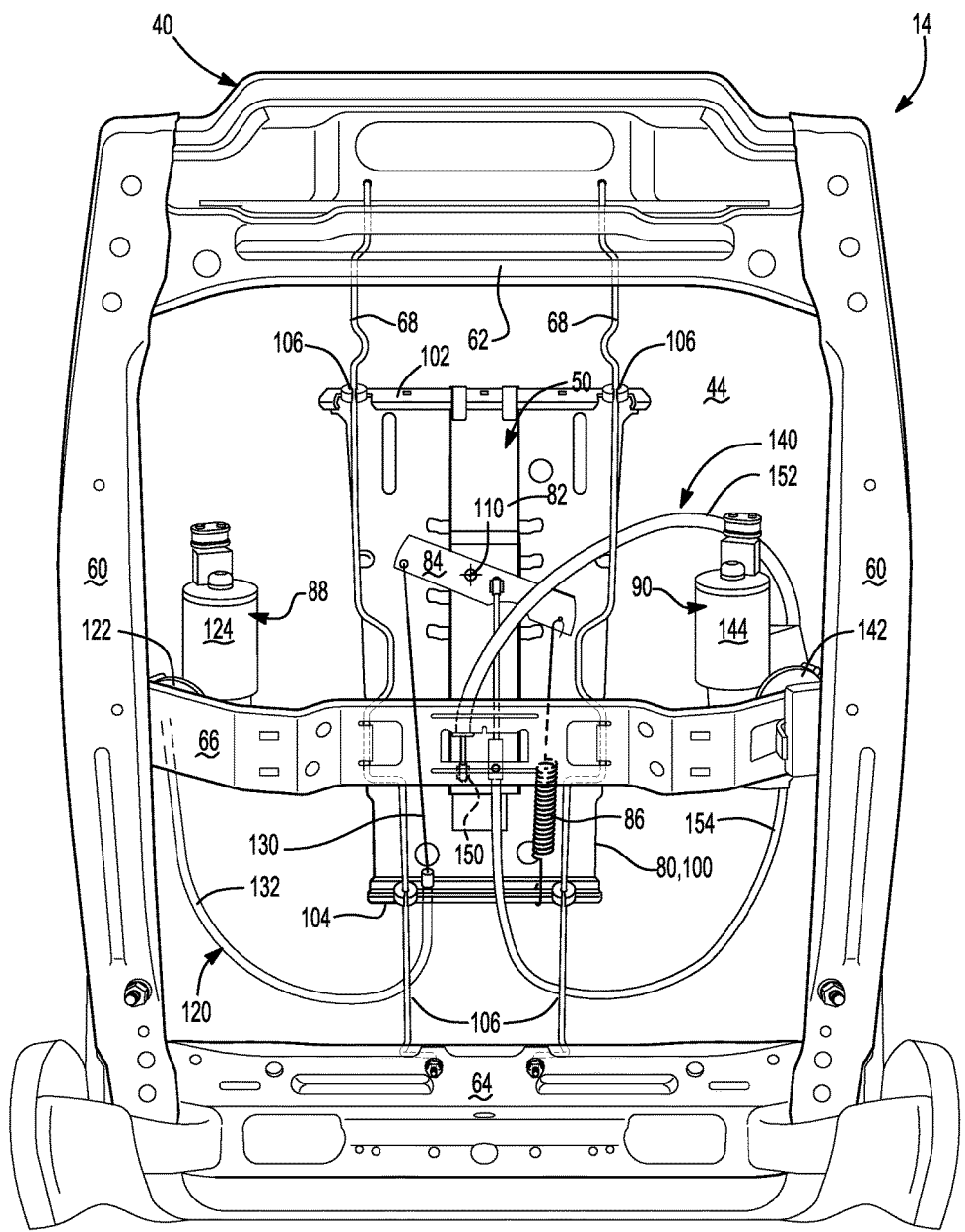
FIG. 3 is a rear view of the seat back of FIG. 2 showing the thoracic support mechanism in a raised position with the flex plate in the unflexed condition.

Referring to FIGS. 2-4, operation of the thoracic support mechanism 50 will now be described in more detail.

Referring to FIG. 2, the thoracic support mechanism 50 is shown in a lowered position with the flex plate 80 in an unflexed condition.

The lowered position may be disposed above the lumbar region 76 so that the thoracic region 70 may be supported. In the lowered position, the flex plate 80 may be positioned along the support members 68 toward the seat bottom 12. In at least one embodiment, the upper end wall 102 of the flex plate 80 may be positioned at its greatest extent or distance from the upper cross member 62 of the seat back frame 40 when in the lowered position.

The unflexed condition may be a nominal position in which the lower end wall 104 of the flex plate 80 may not be actuated toward the upper end wall 102 of the flex plate 80 by the first actuator 88. As such, the upper end wall 102 and the lower end wall 104 may be disposed at their greatest extent or distance with respect to each other when in the unflexed condition. The flex plate 80 may be substantially planar or have its least amount of curvature toward the front of the seat back 14 (i.e., away from the cross bar 66) when in the unflexed condition.

Referring to FIG. 3, the thoracic support mechanism 50 is shown in a raised position with the flex plate 80 in the unflexed condition. In the raised position, the flex plate 80 may be positioned along the support members 68 toward the top of the seat back 14. As such, the upper end wall 102 of the flex plate 80 may be positioned at its greatest extent or distance from the lower cross member 64 when in the raised position.

The flex plate 80 may be actuated from the lowered position to or toward the raised position by the second actuator 90 by retracting or pulling the cable 150 in the upper sheath 152 as previously discussed. Accordingly, the second actuator 90 may exert force that causes the flex plate 80 to slide upward along the support members 68 between the lowered position and the raised position to more precisely align the flex plate 80 with the thoracic region 70 of a particular seat occupant. The flex plate 80 may be actuated from the raised positioned to the lowered position by retracting or pulling the cable in the lower sheath 154 as previously discussed.

Referring to FIG. 4, the thoracic support mechanism 50 is shown in the lowered position with the flex plate 80 in the flexed condition. In the flexed condition, the lower end wall 104 may be actuated or move closer to the upper end wall 102 as compared to the unflexed condition. Movement of the lower end wall 104 toward the upper end wall 102 may cause the flex plate 80 to flex or bend and bow outward toward the front of the seat back 14 and away from the cross bar 66, thereby exerting additional supportive force on the seat back cushion 44 and the thoracic region 70 of a seat occupant. As such, the flex plate 80 may extend along an arc and may move further away from the cross bar 66 as the lower end wall 104 moves closer to the upper end wall 102.

The flex plate 80 may be actuated from the unflexed condition to or toward the flexed condition by the first actuator 88 by retracting or pulling the cable 130 in the sheath 132 of the first actuator 88. Retracting the cable 130 may pull on the pivot member 84 and rotate the pivot member 84 about the pivot member axis 110 in a counterclockwise direction from the perspective shown. Such rotation of the pivot member 84 may in turn extend or stretch the biasing member 86. The biasing member 86 may limit rotation of the pivot member 84 and additional retraction of the cable 130 may then actuate the lower end wall 104 of the flex plate 80 toward the upper end wall 102 due to force exerted by the sheath 132 on the lower end wall 104 and/or pulling force exerted by the biasing member 86 on the lower end wall 104. The unflexed condition is represented by dashed lines in FIG. 4 and flexing of the flex plate 80 toward the seat back cushion 44 is represented by the arrowed lines that extend from the dashed lines.

The flex plate 80 may be actuated from the flexed condition toward the unflexed condition by not pulling on the cable 130 with the first actuator 88 or by reducing the pulling force on the cable 130 below the biasing force exerted by the biasing member 86. In response, the biasing member 86 may rotate the pivot member 84 and a second direction about the pivot member axis 110 and the cable 130 may be extended through the sheath 132, thereby allowing the lower end wall 104 to move away from the upper end wall 102.

The flex plate 80 may be held in the flexed condition or a partially flexed condition by actuating the lower end wall 104 toward the upper end wall 102 by a desired amount and then holding the cable 130 stationary with respect to the sheath 132.

Figure 5:
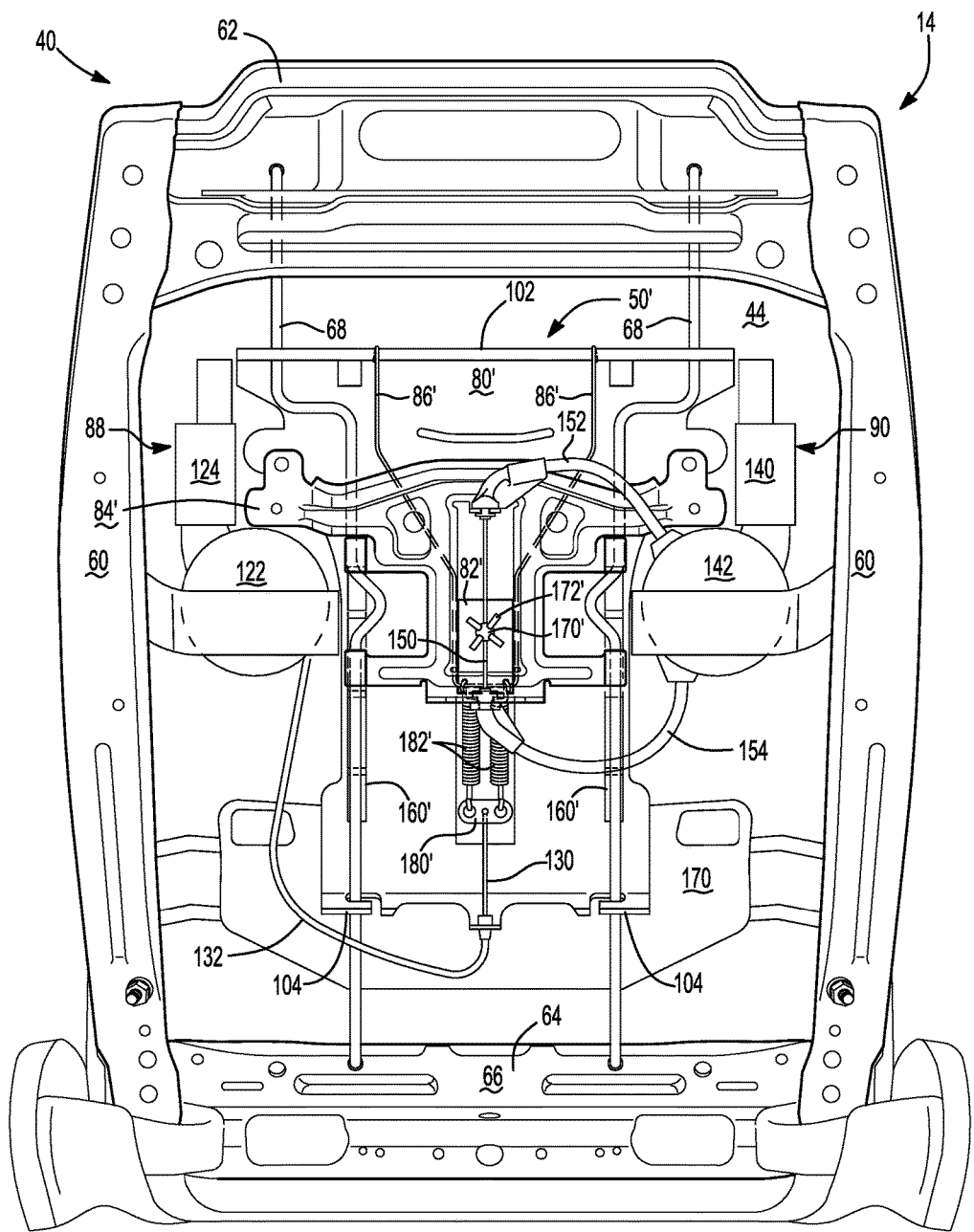
FIG. 5 is a rear view of the seat back without a trim cover showing another version of a thoracic support mechanism in a lowered position with the flex plate in the unflexed condition.
Figure 6:
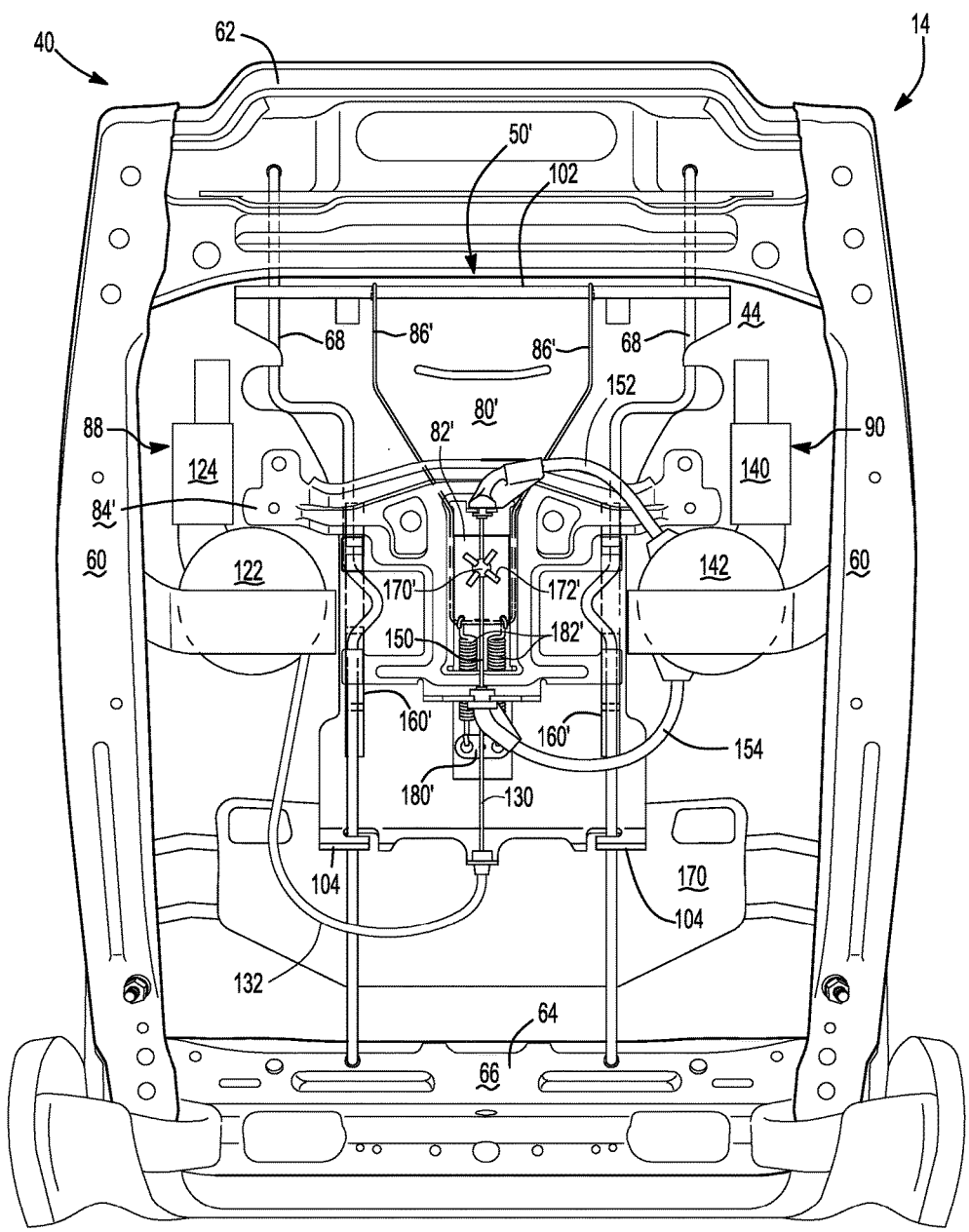
FIG. 6 is a rear view of the seat back of FIG. 5 showing the thoracic support mechanism in a raised position with the flex plate in the unflexed condition.
Figure 7:
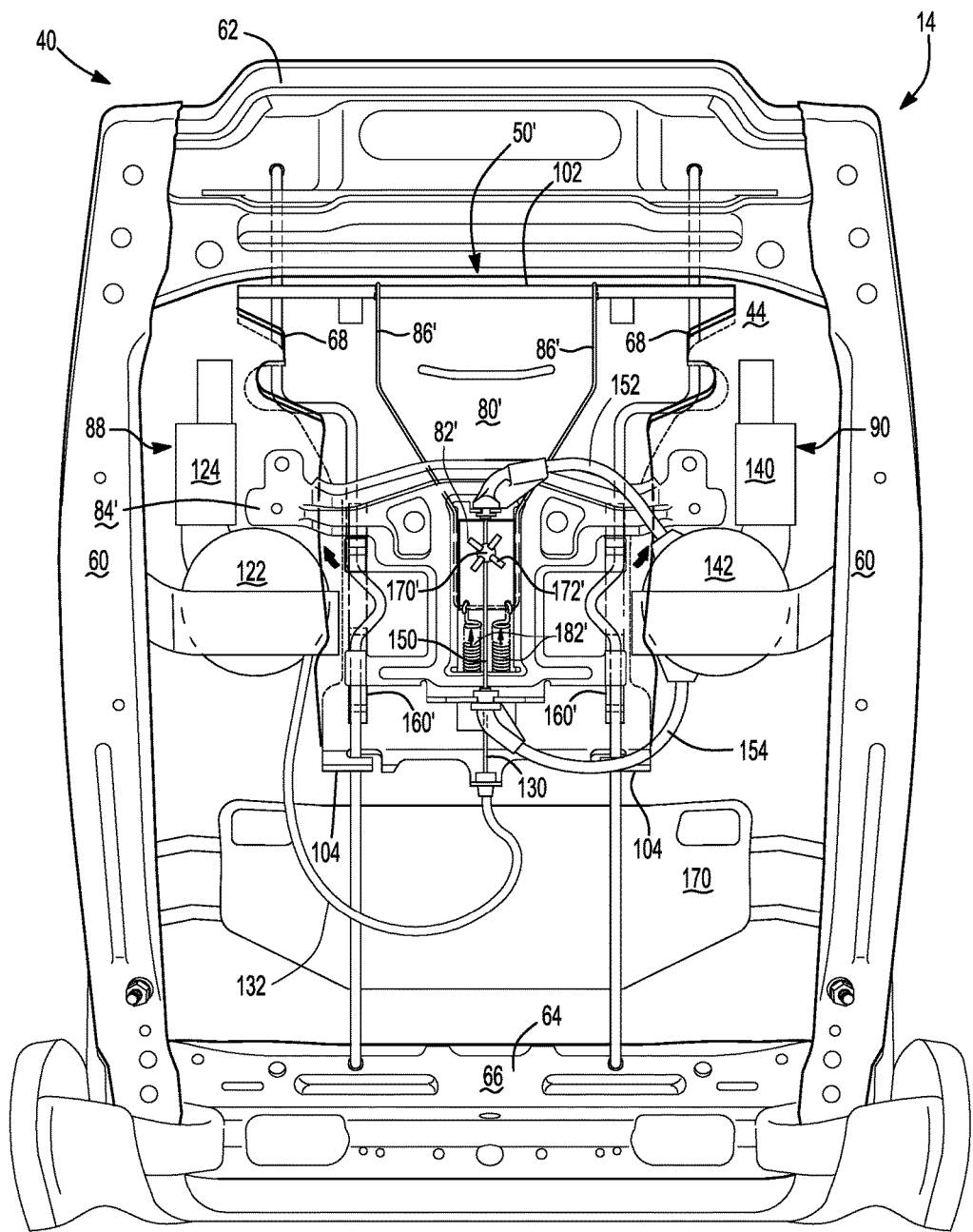
FIG. 7 is a rear view of the seat back of FIG. 6 showing the thoracic support mechanism in the raised position with the flex plate in a flexed condition.

Referring to FIGS. 5-7, another configuration of a thoracic support mechanism 50' is shown. The thoracic support mechanism 50' may include a flex plate 80', a mounting plate 82', a fixed plate 84', and a support wire 86', as well as the first actuator 88, and the second actuator 90.

The flex plate 80' may have a similar configuration as the flex plate 80 shown in FIGS. 2-4. The flex plate 80' may include a plate portion 100, an upper end wall 102, and a lower end wall 104 as well one or more biasing strips 160'. The biasing strips 160' may be disposed on the plate portion 100 and may extend between the upper end wall 102 and the lower end wall 104. The biasing strips 160' may exert a biasing force on the flex plate 80' that may bias the flex plate 80' toward the unflexed condition (i.e., bias the lower end wall 104 away from the upper end wall 102). It is also contemplated that biasing strips 160' could be provided with the configuration in FIGS. 2-4. The upper end wall 102 may be disposed between the upper cross member 62 and the fixed plate 84' and may receive and may slide upon the support members 68 as previously discussed.

The mounting plate 82' may be disposed on the flex plate 80' and may facilitate coupling of the second actuator 90.

The cable(s) 150 associated with the second actuator 90 may include a mounting feature 170' that may be stationary with respect to the cable(s) 150 and that may be received in a mounting boss 172' on the mounting plate 82'. The mounting boss 172' may extend through an opening in the fixed plate 84'.

The fixed plate 84' may be fixedly disposed on the support members 68. For example the fixed plate 84' may be laterally positioned between the side members 60 and vertically positioned between the upper cross member 62 and the cross bar 66. The first actuator 88 and the second actuator 90 may be mounted on disposed on the fixed plate 84'. In addition, the upper sheath 152 and the lower sheath 154 of the second actuator 90 may be fixedly mounted to the fixed plate 84'.

The support wire 86' may be fixedly mounted to the flex plate 80'. For example, the support wire 86' may be fixedly mounted on the upper end wall 102 of the flex plate 80' and the mounting plate 82' may be mounted on the support wire 86'. The support wire 86' may be spaced apart from and may not engage the lower end wall 104 of the flex plate 80' or the seat back frame 40. In addition, the support wire 86' may be laterally disposed between the support members 68.

The first actuator 88 may function and may be generally configured as previously discussed. The end of the cable 130 that extends from the first actuator 88 may be coupled to a coupling 180' which in turn may be coupled to one or more biasing members 182'. The biasing members 182' may extend from the coupling 180' to the mounting plate 82' and the support wire 86'. For example, the biasing members 182' may be hooked onto the mounting plate 82' and the support wire 86'. Alternatively, it is contemplated that cable 130 may be directly coupled to the mounting plate 82', the support wire 86', or both.

Referring to FIGS. 5-7, operation of the thoracic support mechanism 50' will now be described in more detail.

Referring to FIG. 5, the thoracic support mechanism 50' is shown in a lowered position with the flex plate 80' in the unflexed condition. In the lowered position, the flex plate 80' may be positioned along the support members 68 toward the seat bottom 12 as previously discussed. The unflexed condition may be as previously discussed.

Referring to FIG. 6, the thoracic support mechanism 50' is shown in a raised position with the flex plate 80' in the unflexed condition. In the raised position, the flex plate 80' may be positioned along the support members 68 toward the top of the seat back 14. As such, the upper end wall 102 of the flex plate 80' may be positioned at its greatest extent or distance from the lower cross member 64 when in the raised position.

The flex plate 80' may be actuated from the lowered position to or toward the raised position by the second actuator 90 by retracting the cable 150 in the upper sheath 152 as previously discussed. Accordingly, the second actuator 90 may slide the flex plate 80' along the support members 68 between the lowered position and the raised position to more precisely align the flex plate 80' with the thoracic region 70 of a particular seat occupant. The flex plate 80' may be actuated from the raised positioned to the lowered position by retracting the cable in the lower sheath 154 as previously discussed.

Referring to FIG. 7, the thoracic support mechanism 50' is shown in the raised position with the flex plate 80' in the flexed condition. In the flexed condition, the lower end wall 104 may be actuated or move closer to the upper end wall 102 as compared to the unflexed condition. Movement of the lower end wall 104 toward the upper end wall 102 may cause the flex plate 80' to flex or bend and bow outward toward the front of the seat back 14 and away from the cross bar 66, thereby exerting additional supportive force on the seat back cushion 44 and the thoracic region 70 of a seat occupant. As such, the flex plate 80' may extend along an arc and may move further away from the cross bar 66 as the lower end wall 104 moves closer to the upper end wall 102. The unflexed condition is represented by dashed lines in FIG. 7 and flexing of the flex plate 80' toward the seat back cushion 44 is represented by the arrowed lines that extend from the dashed lines.

The flex plate 80' may be actuated from the unflexed condition to or toward the flexed condition by the first actuator 88 by retracting the cable 130 in the sheath 132 of the first actuator 88. Retracting the cable 130 may pull on the coupling 180', biasing members 182', and the mounting plate 82'. Retraction of the cable 130 may then actuate the lower end wall 104 of the flex plate 80' toward the upper end wall 102 due to force exerted by the sheath 132 on the lower end wall 104.

The flex plate 80' may be actuated from the flexed condition toward the unflexed condition by not pulling on the cable 130 of the first actuator 88 or by reducing the pulling force on the cable 130 below the biasing force exerted by the biasing strips 160' of the flex plate 80'. In response, the biasing strips 160' may straighten the flex plate 80', thereby allowing the lower end wall 104 to move away from the upper end wall 102.

The flex plate 80' may be held in the flexed condition or a partially flexed condition by actuating the lower end wall 104 toward the upper end wall 102 by a desired amount and then holding the cable 130 stationary with respect to the sheath 132.

Referring to FIG. 5, a lumbar support 170 may be provided in addition to the thoracic support mechanism 50, 50'. The lumbar support 170 may be operable to support a lumbar region 76 of a spine 72. The lumbar support 170 may be disposed between the thoracic support mechanism 50, 50' and the seat back cushion 44. The lumbar support 170 may be separate from the thoracic support mechanism 50, 50' such that the lumbar support 170 may be spaced apart from and may not engage the thoracic support mechanism 50, 50'. A lumbar support 170 may also be provided with the configuration shown in FIGS. 2-4.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
   a seat back that has a seat back frame that includes:
      upper and lower cross members that extend from a first side member to a second side member;
      a cross bar that is disposed between the upper and lower cross members and extends from the first side member to the second side member; and
      a support member that extends from the upper cross member to the cross bar; and
   a thoracic support mechanism that is moveably disposed on the support member, the thoracic support mechanism including:

a flex plate that is moveably disposed on the support member, the flex plate having an upper end wall and a lower end wall disposed opposite the upper end wall;

a mounting plate that is disposed on the flex plate;

a first actuator that is operatively connected to the flex plate that actuates the lower end wall toward the upper end wall to flex the flex plate away from the cross bar; and a second actuator that is operatively coupled to the mounting plate and that actuates the mounting plate and the flex plate along the support member.

2. The seat assembly of claim 1 wherein the second actuator and the first actuator adjust a position of the thoracic support mechanism to support at least a portion of a thoracic region of a user's spine.

3. The seat assembly of claim 1 wherein the thoracic support mechanism does not support a lumbar region of a user's spine.

4. The seat assembly of claim 1 wherein the upper end wall is disposed between the upper cross member and the cross bar and receives the support member such that the flex plate is slidable along the support member.

5. The seat assembly of claim 4 wherein the thoracic support mechanism further comprises a pivot member that is pivotally disposed on the mounting plate between the upper cross member and the cross bar, wherein the first actuator is coupled to the pivot member and rotates the pivot member with respect to the mounting plate when the lower end wall moves toward the upper end wall.

6. The seat assembly of claim 5 further comprising a biasing member that is coupled to the pivot member and the lower end wall, wherein the biasing member urges the lower end wall away from the upper end wall.

7. The seat assembly of claim 6 wherein the mounting plate is fixedly disposed on the upper end wall of the flex plate.

8. The seat assembly of claim 7 wherein the mounting plate is disposed between the flex plate and the cross bar and is spaced apart from the lower end wall of the flex plate.

9. The seat assembly of claim 8 wherein the lower end wall of the flex plate slides along the support member toward the mounting plate when the first actuator flexes the flex plate away from the cross bar and the lower end wall of the flex plate slides along the support member toward the lower cross member when the biasing member rotates the pivot member.

* * * * *